US006983312B1

(12) United States Patent
O'Neil

(10) Patent No.: US 6,983,312 B1
(45) Date of Patent: Jan. 3, 2006

(54) METHOD FOR USING SCHEDULED HYPERLINKS TO RECORD MULTIMEDIA CONTENT

(75) Inventor: Joseph Thomas O'Neil, Staten Island, NY (US)

(73) Assignee: AT&T Corp., New York, NY (US)

( * ) Notice: Subject to any disclaimer, the term of this patent is extended or adjusted under 35 U.S.C. 154(b) by 912 days.

(21) Appl. No.: 09/906,252

(22) Filed: Jul. 16, 2001

(51) Int. Cl.
 *G06F 15/16* (2006.01)
(52) U.S. Cl. ...................................... 709/217; 455/410
(58) Field of Classification Search ................ 709/202, 709/250, 217; 455/410, 411, 466, 556.1
See application file for complete search history.

(56) References Cited

U.S. PATENT DOCUMENTS

| | | | |
|---|---|---|---|
| 6,763,247 B1 * | 7/2004 | Hollstrom et al. ........ | 455/566.1 |
| 6,801,604 B2 | 10/2004 | Maes et al. ............... | 379/88.17 |
| 6,871,063 B1 * | 3/2005 | Schiffer ...................... | 455/410 |
| 2001/0056502 A1 * | 12/2001 | Hollstrom et al. .......... | 709/250 |
| 2002/0103850 A1 * | 8/2002 | Moyer et al. ............... | 709/202 |
| 2002/0103898 A1 | 8/2002 | Moyer et al. ............... | 709/224 |
| 2002/0177453 A1 * | 11/2002 | Chen et al. ................. | 455/466 |
| 2002/0198941 A1 | 12/2002 | Gavrilescu et al. ......... | 709/205 |
| 2004/0203592 A1 * | 10/2004 | Kermode et al. ........... | 455/411 |

OTHER PUBLICATIONS

Handley et al., *Request for Comments 2543 ("RFC 2543")*, § 4.2.6 (pp. 30-31) and § 16.1 (pp. 118-119), Mar. 1999.

* cited by examiner

*Primary Examiner*—John Follansbee
*Assistant Examiner*—Jungwon Chang

(57) ABSTRACT

A method of establishing communications with one or more devices located in an environment using a wireless communication device is disclosed. The wireless communication device comprises a short-range transceiver that is able to communicate with a short-range transceiver located in the environment. A communication is received from the short-range transceiver of the wireless communication device that includes a request to establish communications with one or more device located in the environment. A request is transmitted to an environment directory server to determine if a user associated with the wireless communication device has permission to access any of the devices in the environment. A response is received from the environment directory server in response to the request. A communication is made to the short-range transceiver of the wireless communication device indicating whether the device can communicate with any of the devices in the environment.

8 Claims, 17 Drawing Sheets

FIG. 3

| | TELEVISION CONTENT (CHANNEL 50) 320 | |
|---|---|---|
| 325 | DATE: MONDAY, 2/26/01 | |
| | TIME | PROGRAM |
| 330 | 6:00PM – 7:00PM EST | NEWS — 302 |
| 332 | 7:00PM – 8:00PM EST | CONCERT AT LINCOLN CENTER — 304 |
| 334 | 8:00PM – 9:00PM EST | FIGURE SKATING — 306 |
| 336 | 9:00PM – 11:00PM EST | RAIDERS OF THE LOST ARK — 308 |

FIG. 4

| ENVIRONMENTS FOR JOSEPH O'NEIL | |
|---|---|
| 402 | RAIDERS OF THE LOST ARK, MONDAY, 2/26/01, 9PM – 11PM EST |
| | ENVIRONMENTS |
| 404 | HOME |
| 406 | AT&T MIDDLETOWN |
| 408 | AT&T FLORHAM PARK |
| 410 | CONTINENTAL AIRLINES FLIGHT 17 (TUESDAY, 2/27/01) |
| 412 | MARRIOTT IN SANTA CLARA (TUESDAY, 2/27/01) |

FIG. 5

DEVICES FOR JOSEPH O'NEIL

502

RAIDERS OF THE LOST ARK, MONDAY, 2/26/01, 9PM – 11PM EST

| ENVIRONMENT | DEVICE | TOTAL STORAGE (510) | AVAILABLE STORAGE (512) |
|---|---|---|---|
| HOME | 504 — LIVING ROOM SET TOP BOX | 10 HOURS | 1 HOUR |
| HOME | 506 — DEN SET TOP BOX | 12 HOURS | 8 HOURS |
| HOME | 508 — FAMILY ROOM SET TOP BOX | 10 HOURS | 0 HOURS |

ENVIRONMENTS

LIVING ROOM SET TOP BOX

602 — TOTAL STORAGE = 10 HOURS
AVAILABLE STORAGE = 1 HOUR
REQUIRED STORAGE FOR 'RAIDERS OF THE LOST ARK' = 2 HOURS

| TITLE | DURATION | STATUS | DELETE? |
|---|---|---|---|
| OLYMPIC GAMES CLOSING CEREMONY | 4 HOURS | STORED | ☐ |
| 604 — GONE WITH THE WIND (PART I) | 3 HOURS | SCHEDULED | ☐ |
| ET | 2 HOURS | RECORDING | ☐ |

| ENVIRONMENTS | DEVICES | RECORD | CONFIGURE | EMAIL |
|---|---|---|---|---|
| 606 | 608 | 610 | 612 | 614 |

FIG. 9

| USER | ENVIRONMENTS | TRANSIENT? | EXPIRATION TIME |
|---|---|---|---|
| JOE O'NEIL | http://www.airline.com/environments/4589732 | YES | 2/27/01, 13:00 EST |
| JOE O'NEIL | http://www.hotel.com/environments/12976123 | YES | 3/2/01, 12:00 PST |
| JOE O'NEIL | http://www.isp.com/environments/6541973 | NO | |
| JOE O'NEIL | http://www.university.com/environments/12774293 | NO | |
| JOE O'NEIL | http://www.work.com/environments/2218418 | NO | |
| JOE O'NEIL | http://www.conference-rooms.com/environments/2218418 | YES | 2/26/01, 17:00 EST |

| ENVIRONMENT ID (1002) | ENVIRONMENT NAME (1004) |
|---|---|
| 6541973 | HOME |
| 6541974 | HOME |
| 6541975 | HOME |

FIG. 11

| ENVIRONMENT ID (1102) | DEVICE NAME (1104) | URL OF DEVICE (1106) | GROUP ID (1108) |
|---|---|---|---|
| 6541973 | LIVING ROOM SET TOP BOX | sip:livingroomstb@6541973.isp.com | 1 |
| 6541973 | DEN SET TOP BOX | sip:denstb@6541973.isp.com | 1 |
| 6541973 | FAMILY ROOM SET TOP BOX | sip:familyroomstb@6541973.isp.com | 1 |

FIG. 12

| GROUP ID (1202) | PERSON (1204) | PERMISSIONS (1206) |
|---|---|---|
| 1 | DEFAULT | NONE |
| 1 | JOE O'NEIL | CONFIGURE, DELETE, LIST, RECORD, VIEW |
| 1 | JOHN CASTO | DELETE, LIST, RECORD, VIEW |
| 1 | JENNIFER CASTO | VIEW |

FIG. 16

```
                    RAIDERS OF THE LOST ARK
        OPTIONS:
                ┌─────────────────────────────────────────────────────────────┐
                │ TELEVISION, CHANNEL 40, SUNDAY, 6/10/01, 2PM - 4PM EST      │
                │ RADIO, CHANNEL 1010, WEDNESDAY, 5/9/01, 1AM - 3AM EST       │
        1602 ~  │ STREAMING MULTIMEDIA, http://www.movies.com/raiders-of-the-lost-ark.asf │
                │ DVD PURCHASE ($10)                                          │
                └─────────────────────────────────────────────────────────────┘

ALTERNATIVES:
                ┌─────────────────────────────────────────────────────────────┐
                │ INDIANA JONES AND THE TEMPLE OF DOOM                        │
                │    TELEVISION, CHANNEL 40, SUNDAY, 6/10/01, 2PM - 4PM EST   │
        1604 ~  │    STREAMING MULTIMEDIA, http://www.movies.com/raiders-of-the-lost-ark.asf │
                │    DVD PURCHASE ($10)                                       │
                └─────────────────────────────────────────────────────────────┘
```

| FROM: | Teacher@isp.com |
| TO: | Student1@isp.com; Student2@isp.com; Student3@isp.com; Student4@isp.com |
| SUBJECT: | CLASS MATERIAL |

1902

PLEASE RECORD THE FOLLOWING MATERIAL FOR OUR CLASS ON MAY 5, 2001 AT 7PM.

1904

1906 — NATURE: CALL OF THE WILD
    1908 — NATIONAL GEOGRAPHIC

METHOD FOR USING SCHEDULED HYPERLINKS TO RECORD MULTIMEDIA CONTENT

TECHNICAL FIELD

The present invention relates to scheduled multimedia content, and more particularly, to a method that allows a user to use a hyperlink to access scheduled multimedia content by being able to locally record selected multimedia content on a designated information appliance.

BACKGROUND OF THE INVENTION

Today, many people have embraced the information age and depend upon multimedia devices to provide them with a means to receive current information as well as the ability to communicate with other people. Many homes now include at least one personal computer and television. In addition, many people own Set Top Boxes (STB), Digital Video Disc (DVD) players and equipment such as cameras, scanners and software for enabling their personal computers and televisions to be used as multimedia communication devices.

In addition, many offices, hotels and airplanes are equipped with multimedia equipment which may be used for either business or pleasure. It is a natural progression, that people will want to be able to view particular multimedia content at a particular time and at a particular place (e.g., view a broadcast program while in flight). While the current technology allows for users to schedule a viewing of a particular program at a particular time (e.g., video recorders), the current technology does not conveniently allow for scheduling the availability of multimedia content on a designated device, which may or may not be operated by the user, at a particular time.

In order to achieve this goal of being able to view multimedia content at a particular time and a particular place, there must be a mechanism for identifying the available multimedia content and for recording the content locally at the place in which the content is to be viewed. While products such as TiVo™ allow for the scheduled viewing of multimedia content on a local recording device, TiVo™ does not currently allow for the scheduled viewing of multimedia content on a variety of devices located in a variety of places and which may be operated by more than one entity.

SUMMARY OF THE INVENTION

The present invention is directed to a method of scheduling to record multimedia content on a first device via a second wireless communication device. The wireless communication device includes a short range wireless transceiver that is able to communicate with a short range wireless transceiver co-located in the environment of the first device in order to schedule the recording of content on the first device. The wireless communication device also includes a long range wireless transceiver that is able to retrieve a web page containing a listing of multimedia content provided by one or more content providers. Each listing of multimedia content includes one or more scheduled hyperlinks. Each scheduled hyperlink corresponds to particular multimedia content. In response to selection of a scheduled hyperlink, a scheduled hyperlink file is retrieved that contains scheduling information pertaining to particular multimedia content. A web page is communicated to the wireless communication device that contains one or more web addresses corresponding to an environment that is accessible by the user. In response to selection of a web address corresponding to a particular environment, a second web page is communicated to the wireless communication device that contains one or more web addresses corresponding to a device located at the selected environment. In response to selection of a web address corresponding to the first device, a third web page is communicated to the wireless communication device that includes a listing of all content recorded on the first device, a listing of all content scheduled to be recorded on the first device and an indication of the available storage time on the first device. If there is enough storage time on the first device, a communication is received from the wireless communication device requesting that the selected content be scheduled to be stored on the first device.

The present invention is also directed to a method of establishing communications with one or more devices located in an environment using a wireless communication device. The wireless communication device comprises a short-range transceiver that is able to communicate with a short-range transceiver located in the environment. A communication is received from the short-range transceiver of the wireless communication device that includes a request to establish communications with one or more device located in the environment. A request is transmitted to an environment directory server to determine if a user associated with the wireless communication device has permission to access any of the devices in the environment. A response is received from the environment directory server in response to the request. A communication is made to the short-range transceiver of the wireless communication device indicating whether the device can communicate with any of the devices in the environment.

BRIEF DESCRIPTION OF THE DRAWINGS

The present invention is illustrated by way of example and not limitation in the accompanying figures in which like reference numerals indicate similar elements and in which:

FIG. 3 is an illustration of a web page that is retrieved by the system of FIG. 1 which includes scheduled hyperlinks in accordance with the present invention;

FIG. 4 is an illustration of a web page that is retrieved by the system of FIG. 1 which includes a list of environments in accordance with the present invention;

FIG. 5 is an illustration of a web page that is retrieved by the system of FIG. 1 which includes a list of devices associated with an environment in accordance with the present invention;

FIG. 6 is an illustration of a web page that includes statistics pertaining to a particular device in accordance with the present invention;

FIG. 9 is an illustration of a table that provides a listing of the environments associated with a particular user in accordance with the present invention;

FIG. 10 is an illustration of a table that provides a listing of environment IDs and their associated locations in accordance with the present invention;

FIG. 11 is an illustration of a table that provides a listing of devices in a particular environment in accordance with the present invention;

FIG. 12 is an illustration of a table listing the people and permission levels associated with a particular environment in accordance with the present invention;

FIG. 16 is an illustration of a web page presented to a user that lists options for obtaining desired content and alternatives to that content in accordance with the present invention;

DETAILED DESCRIPTION

The present invention is directed to a method and system for creating hyperlinks for recording and viewing scheduled multimedia content where the multimedia content is stored on a designated information appliance.

System Architecture

Figure 1:
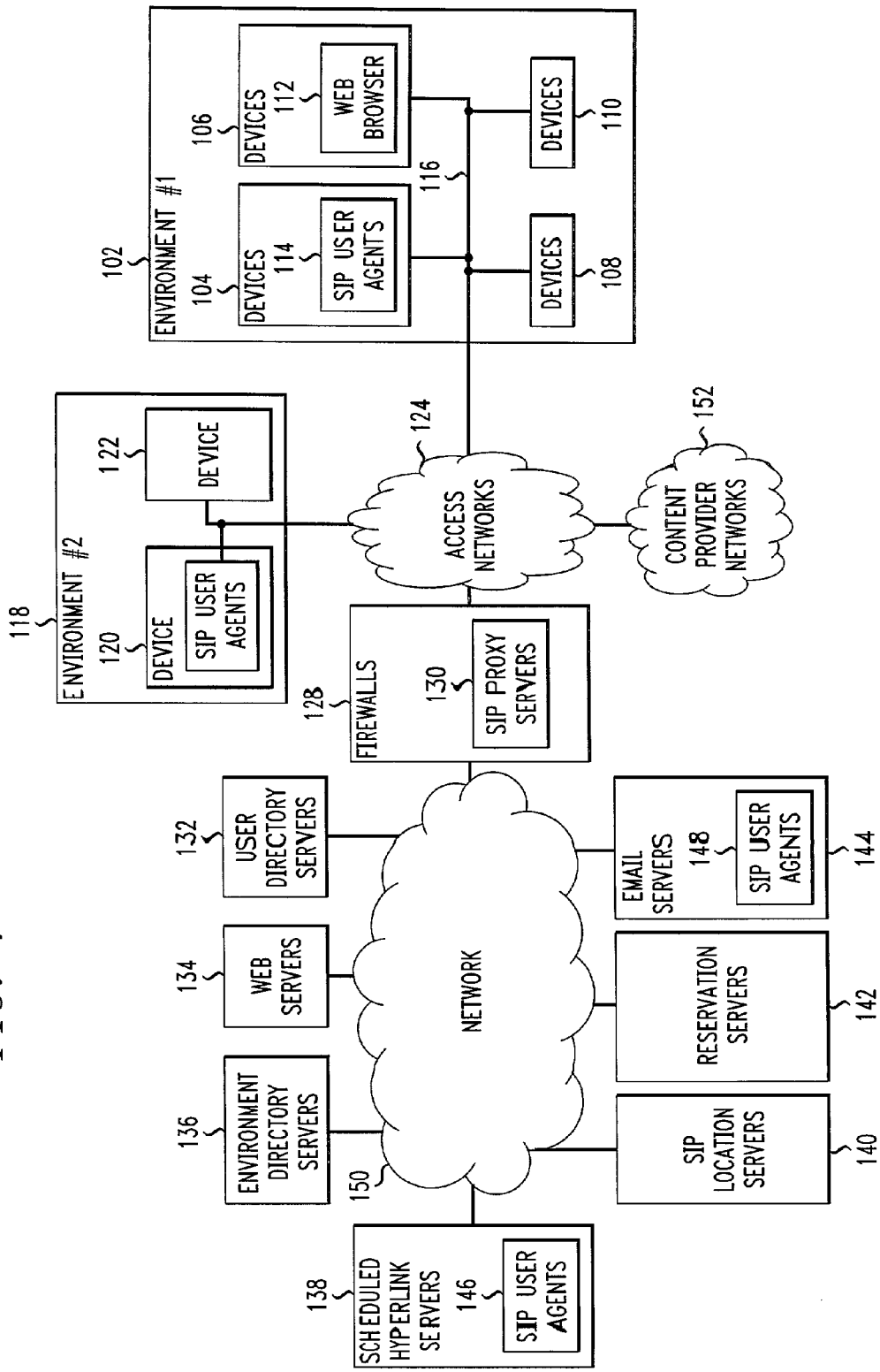
FIG. 1 is a block diagram of a system architecture for creating hyperlinks to scheduled multimedia content in accordance with the present invention.

FIG. 1 is an illustrative embodiment of a system architecture for which a user desiring to record and view multimedia content in accordance with the present invention can be implemented. The user may be at an environment 102 which can be a home or a business office or any other location which is occupied by the user and have access to a plurality of information appliances 104, 106, 108, 110. The information appliances may include, but are not limited to personal computers, televisions, Set Top Boxes (STBs), television originated Internet access packages such as Microsoft's™ WebTV™, Digital Video Disc (DVD) players, and Compact Disk (CD) players which are each networked together via a Local Area Network (LAN) 116. The information appliance may also be a wireless device (see FIG. 2) such as a wireless telephone with Internet capability, a handheld organizer or personal communication device as will be discussed in greater detail hereinafter.

Each information appliance 104, 106, 108, 110 may be located in the same room or one or more information appliances may be located in different rooms. The user may also have access to information appliances 120, 122 located in one or more different environments, such as environment 118. Each information appliance includes memory (not shown) that can be used to store multimedia content, and access to an interface (e.g., SIP user agent 114 in device 104) used to communicate with other devices. In some cases, the interface may be used to communicate with network servers (e.g., scheduled hyperlink server 138 or email server 144) as will be described in detail hereinafter. Furthermore, some of the devices may include a web browser (e.g., device 106) that is used to communicate to network servers over a network, such as the Internet.

Each information appliance is also identifiable by a network address, such as, but not limited to, an Internet Protocol (IP) address. In accordance with the present invention, the appliance may be identified by a Session Initiation Protocol (SIP) address as will be explained in detail hereinafter. Within a given environment, the information appliances are networked together via a home network. Standards for defining home network arrangements have been provided by various organizations.

For example, the Video Electronics Standards Association (VESA) has defined standards for physical media, data link layers, mid-layer protocols and other services such as directories, control, network management and security required for setting up such a home network. These standards can be found at http://www.vesa.org and are incorporated by reference. External access networks such as telephone (PSTN), cable TV, broadcast TV and direct-broadcast satellite can interface with the home network via access devices such as residential gateways or cable modems.

The information appliances 104, 106, 108, 110 are connected to various network servers via access networks 124. In the present example, the access networks 124 connect the user to a plurality of servers 130, 132, 134, 136, 138, 140, 142, 144 which are used to implement the present invention and to content provider networks 152 which contain the multimedia content that the user wishes to store locally on one of his associated devices. The access networks 124 may comprise the Public Switched Telephone Network (PSTN), a Digital Subscriber Link (xDSL), Hybrid Fiber Coax (HFC), fixed wireless, Integrated Services Digital Network (ISDN), Asynchronous Transfer Network (ATM), frame relay network, wireless network, cable network or any other type of suitable transmission means. The plurality of servers 130, 132, 134, 136, 138, 140, 142, 144 may be operated by a single entity or a number of different entities without departing from the scope and spirit of the present invention.

Using one of the information appliances 106 (for exemplary purposes it is assumed that the appliance is a personal computer (PC)), a user establishes a connection with IP network 150 via a Point of Presence (POP) (not shown) which is typically operated and maintained by an Online Service Provider (OSP). The POP may illustratively, be a server which is connected to the IP network 150, or may be any other server used for providing access to the IP network 150. The user's information appliance 106 may include a monitor, keyboard, microphone, mouse, camera or other equipment necessary to implement various software applications or modes of communication. The POP provides access to the IP network 150 by providing software to information appliance 106, which allows the information appliance 106 to access the IP network 150.

When a user wishes to access the IP network 150, the user types in a command that causes the information appliance 106 to dial into the POP. The POP requires that the user be authenticated prior to gaining access to the IP network 150. It is to be understood by those skilled in the art that any type of authentication means can be used. For example, the POP may request a user identification code and password that is verified by the POP. The POP then acts as a gateway to provide the user access to the IP network 150. The information appliance 106 is connected to the POP via the access networks 124.

A user that is connected to the Internet may cause a program known as a client to request resources that are part of the World Wide Web. The collection of all such publicly available resources, linked together using files written in Hypertext Mark-up Language ("HTML"), is known as the World Wide Web ("web"). Server programs then process the requests to return the specified resources. A standard naming convention has been adopted, known as a Uniform Resource Locator ("URL"). This convention encompasses several types of location names, presently including subclasses such as Hypertext Transport Protocol ("http"), File Transport Protocol ("ftp"), gopher and Wide Area Information Service ("WAIS").

As illustrated, the IP network 150 is connected to one or more web servers 134 which may host a plurality of online information services, software applications or web sites. In accordance with the present invention, the web servers 134 are also used to store web pages that include scheduled hyperlinks as will be described in greater detail hereinafter. These web pages may be provided directly from the content providers (e.g., broadcast television stations) or may be created by entities that aggregate content information to be disclosed to the viewing community (e.g., TV guide). It is to be understood by those skilled in the art that many web servers may be connected to the IP network 150 in a known configuration and accessed by the user.

A scheduled hyperlink server 138 dynamically generates web pages that provide information to the user about environments and devices which are accessible to the user. The scheduled hyperlink server 138 also coordinates the actions of the various servers that are required to implement the scheduled hyperlinks. Such actions may include programming a particular device to record scheduled content as requested by the user.

A user directory server 132 maintains one or more databases that define the environments that are available to each user. As will be described in detail hereinafter, the user directory server 132 can be updated by the reservation server 142 with regard to transient environments (i.e., environments which may be temporarily available to the user). An environment directory server 136 defines the devices that are available in each environment. Each server may be operated by the entity which controls the environment (e.g., airline, hotel) or access to the environment (e.g., ISP).

A SIP location server 140 maintains databases that map a SIP URL for a particular device to an IP address associated with a SIP proxy server 130. The SIP proxy servers 130 are situated between public and private networks and are used in the communication of two appliances or the scheduled hyperlink server 138 and one or more appliances. In some cases, the appliance may include a SIP user agent that is identified by a SIP URL and is used to facilitate the communication with other SIP user agents. An email server 144 also allows for scheduled hyperlinks to be communicated between users via email messages as will be described in detail hereinafter.

Figure 2:
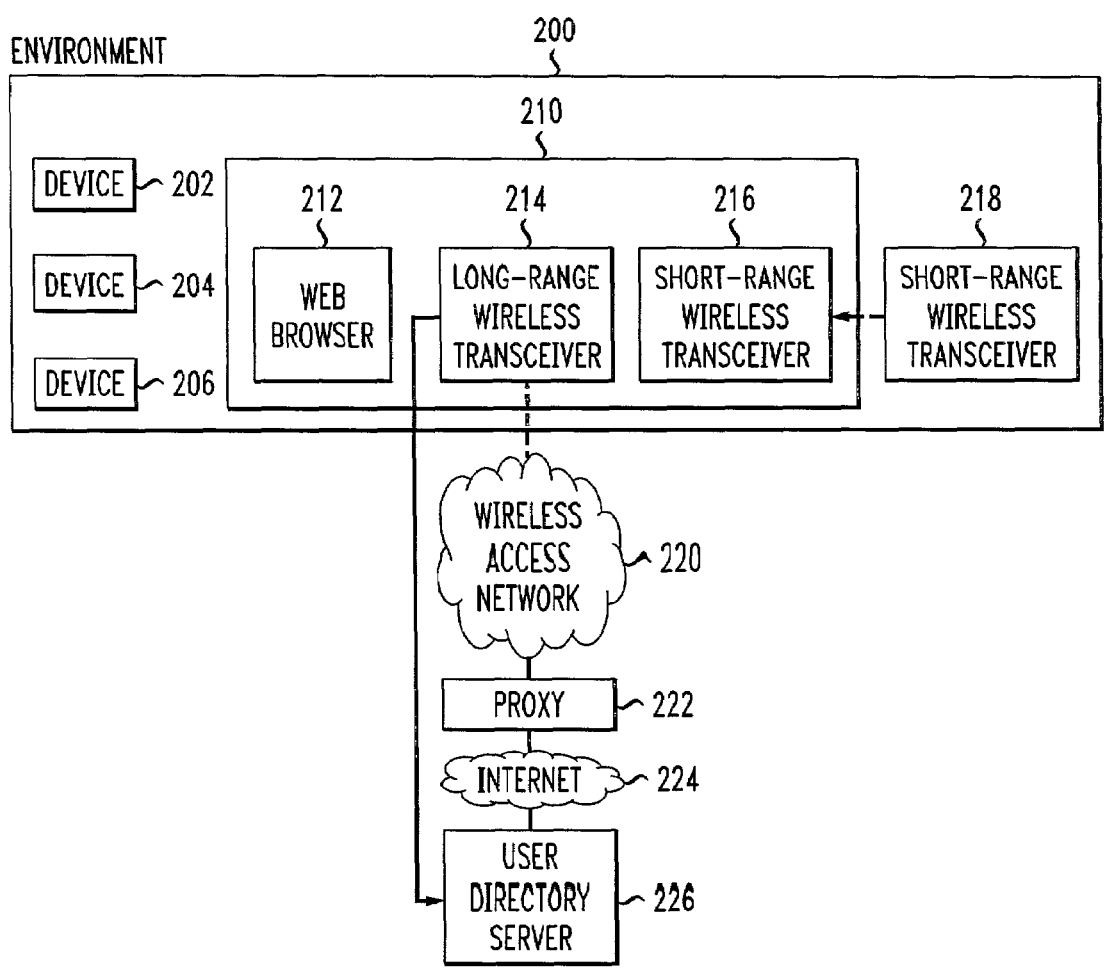
FIG. 2 is a block diagram of a wireless system architecture for creating hyperlinks to scheduled multimedia content in accordance with the present invention.

As indicated above the information appliance may be a wireless device as illustrated in FIG. 2. A wireless information appliance 210 can be used to program one or more devices 202, 204, 206 within an environment 200 in which the wireless device 210 is located to record scheduled content. The environment 200 may be at the user's home or office, or may be a transient environment such as a hotel room or conference room. In accordance with the present invention, the environment would include a short-range wireless transceiver 218 that periodically transmits the URL of the current environment to the device 210. The short-range wireless transceivers 216, 218 may use wireless technology such as that developed by the Bluetooth™ Special Interest Group.

A short-range wireless transceiver 216 is also included in the wireless device 210 that is capable of communicating with the short-range wireless transceiver 218 in the environment 200. The wireless device 210 may be, but is not limited to, a wireless telephone with Internet capability or a handheld personal communication unit. A web browser 212 is included in the wireless device 210 to allow the device to retrieve web pages from the Internet 224.

The wireless device 210 uses a long-range wireless transceiver 214 to communicate URLs to the Internet 224 via a wireless access network 220. As with any device, communications from the wireless device 210 are communicated to a proxy server 222 that registers the location of the wireless device 222 and transports communications to and from the wireless device 210.

Prior to the user of the wireless device 210 being able to schedule the recording of multimedia content on one of the devices within the environment 200, a query is sent to the user directory server 226 to determine if the user has permission to record content on any or all of the devices 202, 204, 206 in the environment. If the user has the appropriate permissions, recording of content can be scheduled as will be described in detail hereinafter. In the case of a transient environment, such as a conference room or hotel room, the user may have permission to access the devices 202, 204, 206, but the permission may be only for a limited period of time.

An embodiment of the present invention will now be discussed from the perspective of a user of an information appliance. It is to be understood by those skilled in the art that the invention could be described from the perspective of any of the information appliances mentioned above or illustrated in FIG. 1 or 2. A user of information appliance 106 wishes to record scheduled multimedia content on a designated information appliance which may or may not be information appliance 106 and view the recorded multimedia content on that information appliance at a later time.

Session Initiation Protocol (SIP) User Agents and Proxy Server

In accordance with the present invention, SIP user agents are used to communicate messages between the scheduled hyperlink server 138 and at least one information appliance located within a given environment (e.g., device 104 in environment 102). SIP is an Internet Engineering Task Force (IETF) protocol standard which can be used to create, modify and terminate multimedia sessions and is described in "SIP: Understanding the Session Initiation Protocol", by Johnston, Artech, 2001 which is incorporated by reference.

Each information appliance or server which includes a SIP user agent is identifiable by a SIP URL which has the format of sip:devicename@environment ID.isp.com. The SIP user agent is capable of receiving and responding to requests from a SIP user agent 146 associated with the scheduled hyperlink server 138. Such requests might include requests to list content, record program and delete content as will be described in more detail hereinafter.

Figure 17:
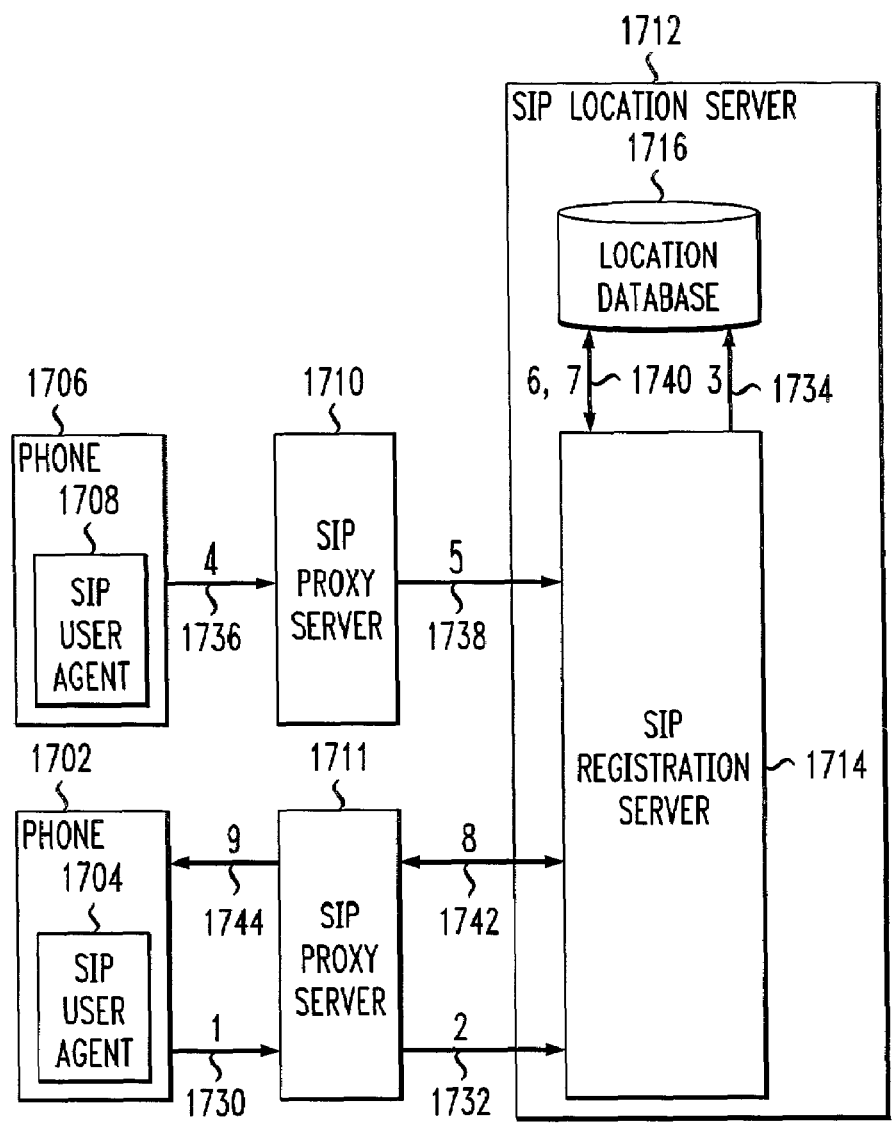
FIG. 17 is a block diagram illustrating how SIP is used to communicate between two information appliances in accordance with the present invention.

Referring to FIG. 17, in order for an information device to communicate with other devices, the SIP user agent must be registered and recognized by a SIP location server 1712. For discussion purposes, a user (Ann@att.com) is using an information appliance 1702 (e.g., phone) that includes a SIP user agent 1704. The SIP user agent 1704 sends a message 1730 to a SIP proxy server 1711 indicating that the associated information appliance 1702 wishes to establish communication with other devices. The SIP proxy server selected is based on the proximity of the proxy server to the device and it is contemplated that a plurality of SIP proxy servers would be geographically disbursed for ease of communication. The SIP proxy server 1711 forwards the message 1732 to a SIP registration server 1714 that resides in the SIP location server 1712.

The SIP registration server 1714 includes a database of all registered SIP user agents as well as a list of users who are able to access a particular SIP user agent. If the SIP user agent and user are found in the SIP registration server 1714, the device, user name and location of the information appliance 1702 is stored in a location database 1716. As such, when another user (e.g., Joe@att.com-Joe) wishes to contact Ann@att.com (Ann), then the SIP location server will know where to direct the communication.

When Joe wants to communicate with Ann, the SIP user agent 1708 associated with Joe's information appliance 1706 sends a message 1736 to the SIP proxy server 1710 which is geographically closest to the information appliance 1706. The SIP proxy server 1710 forwards a message 1738 to the SIP location server 1712. The SIP registration server 1714 determines whether Joe's SIP user agent 1708 can communicate with Ann's SIP user agent 1704. Such a determination may be based on a number of factors including permission levels, availability of Ann, etc., for a given user. If Joe's SIP user agent 1708 is able to communicate with Ann's SIP user agent 1704, then a lookup 1740 is performed in the location database 1716 to determine the location of the information appliance 1702 and the SIP proxy server 1711 closest to the appliance 1702. Next, a message 1742, 1744 is sent from the SIP registration server 1714 to the SIP proxy server 1711 and finally to the information appliance 1702. A communication channel is then established between Joe's SIP user agent 1708 and Ann's SIP user agent 1704.

In accordance with a further embodiment of the present invention, it is also possible for communication from one SIP user agent to another SIP user agent to be applied to a device that does not have a SIP user agent. In arranging for the recording of multimedia content on different information appliances, it is conceivable that relatively simple devices (e.g., televisions, stereos, etc.), which do not have SIP user agents, would be the designated device by the user for recording the desired multimedia content. In accordance with the present invention, devices which do not have SIP user agents can be connected to devices that do have SIP user agents (e.g., set top boxes) and communication can occur between the SIP user agent of the set top and the SIP user agent 146 of the scheduled hyperlink server 138 for arranging viewing of content on the device. As long as at least one appliance in a particular environment has a SIP user agent, and the appliances are networked together via a Local Area Network (LAN) or other similar arrangement, then the device without the SIP user agent can be controlled by the device with the SIP user agent.

Figure 21:
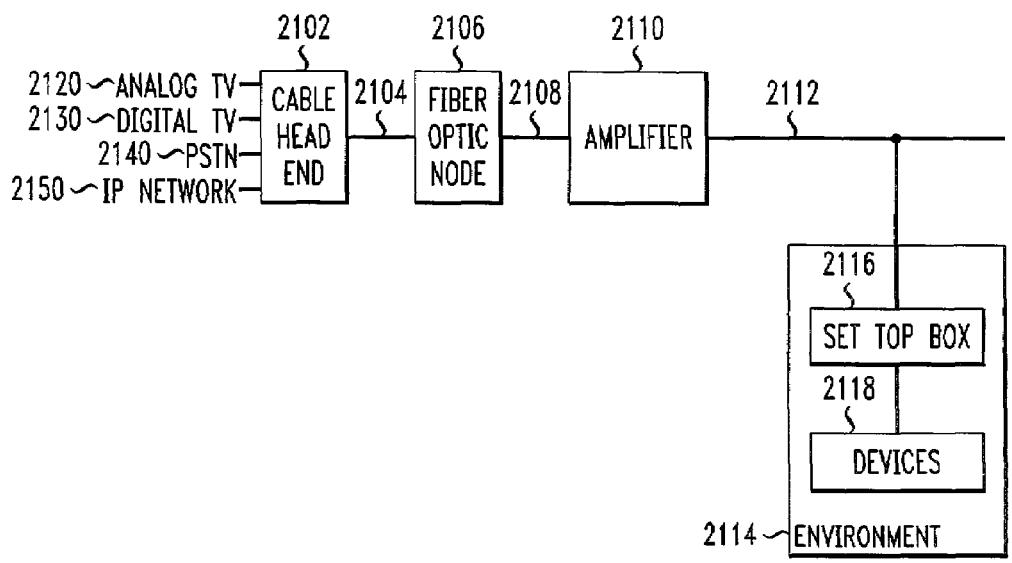
FIG. 21 is a block diagram of a Hybrid Fiber Coax (HFC) access network which can be used to record scheduled content in accordance with the present invention.
Figure 22:
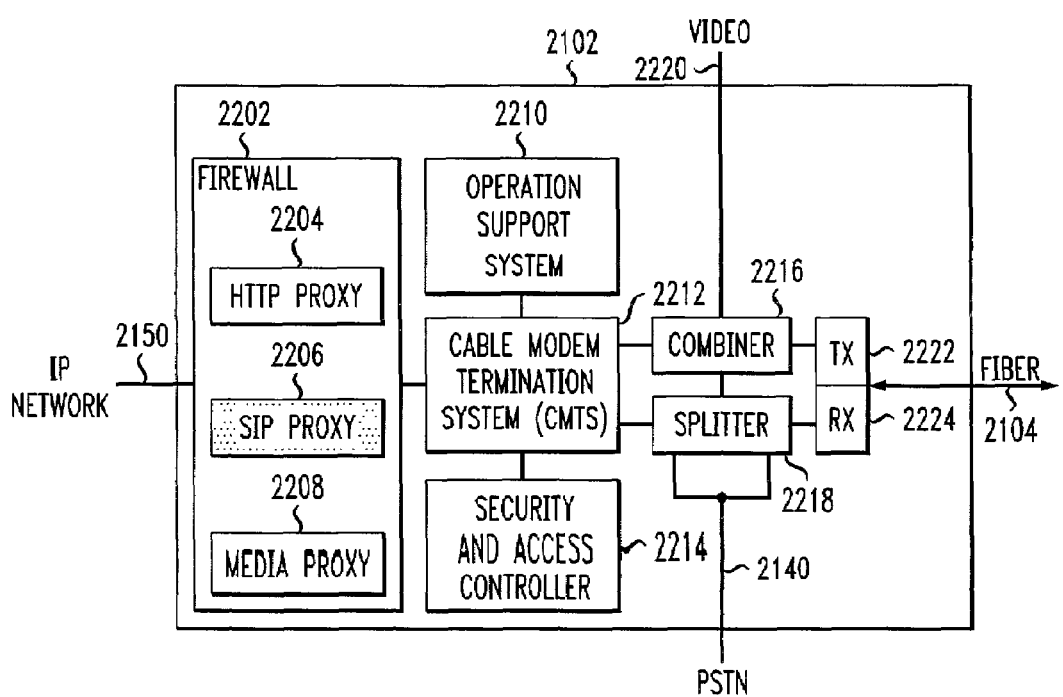
FIG. 22 is a more detailed block diagram of the cable headend of FIG. 21 in accordance with the present invention.
Figure 23:
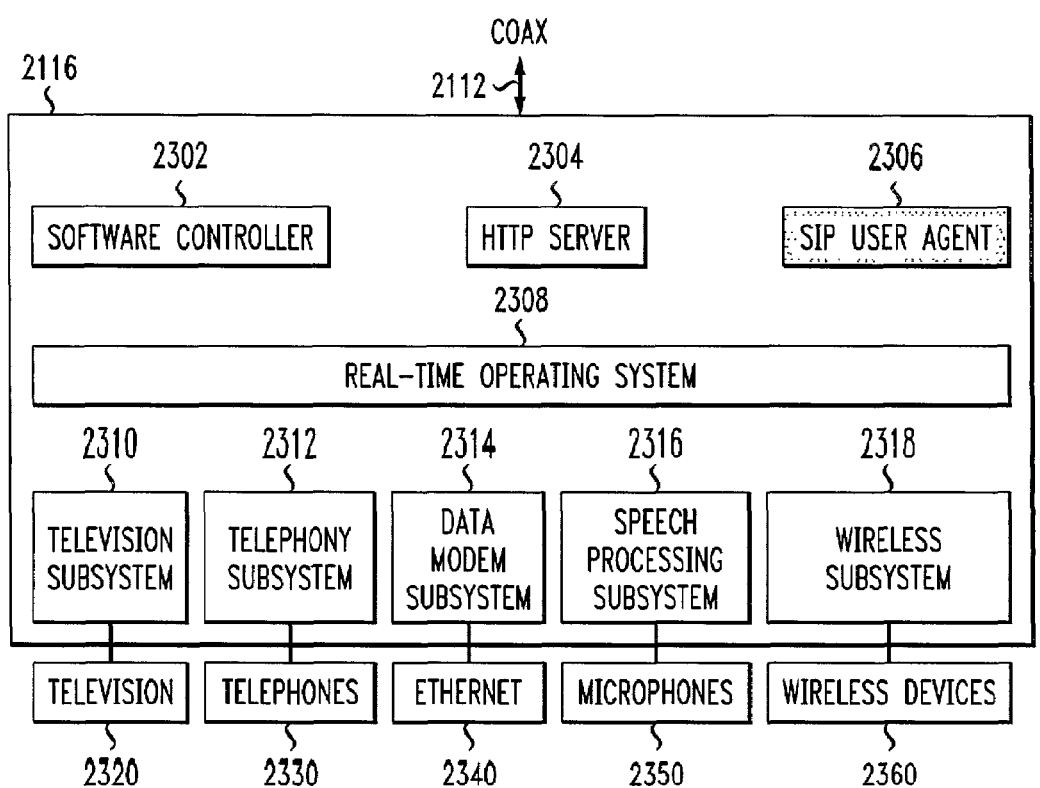
FIG. 23 is a more detailed block diagram of the set top box of FIG. 21 in accordance with the present invention.

FIGS. 21–23 illustrate an exemplary Hybrid Fiber Coax (HFC) network that includes a SIP-enabled set top box in accordance with the present invention. An environment 2114, includes one or more devices 2118 which are connected to a set top box 2116. The set top box 2116 is connected to an amplifier 2110 via a coax cable 2112. The amplifier 2110 amplifies the signals transmitted to and from the set top box 2116. The amplifier 2110, in turn, is connected via coax cable 2108 to a fiber optic node 2106. The fiber optic node 2108 is connected by fiber to a cable headend 2102. The cable headend 2102 is the originating point of a signal in the cable television system. The cable headend 2102 may receive transmissions from analog television 2120, digital television 2130, PSTN 2140 and the IP network 2150. In other words, scheduled content is transmitted from the cable headend 2102 to the set top box 2116 to be recorded for later viewing.

FIG. 22 is a more detailed block diagram of cable headend 2102. The cable headend 2102 includes a firewall 2202 that acts as a filter to the IP network 2150 and determines what communications can be received by the set top box 2116 and other devices that are connected to the headend 2102. The firewall 2202 includes a number of proxy servers including an HTTP proxy server 2204, SIP proxy server 2206 and a media proxy server 2208. The HTTP proxy server determines which web pages may be transmitted via the cable headend 2102. The SIP proxy server 2206 is used to establish communication with SIP user agents connected to the cable headend 2102. The media proxy server 2208 determines which content providers can transmit content via the cable headend 2102.

Also included in the cable headend 2102 is a Cable Modem Termination System (CMTS) 2212. CMTS 2212 is an element of Data Over Cable Service Interface Specification (DOCSIS) that has been developed for high-speed data transfer over cable television systems. CMTS 2212 comprises CMTS-DRFI (CMTS-Downstream RF Interface), CMTS-NSI (CMTS-Network Side Interface) and CMTS-URFI (CMTS-Upstream RF Interface) in order to provide two-way communications. An operation support system 2210 and security and access controller 2214 are also included in the cable headend 2102 to provide additional provisioning capabilities.

FIG. 23 is a more detailed block diagram of set top box 2116. Included in the set top box 2116 is a SIP user agent 2306 for communication with the scheduled hyperlink server 138 as well as other devices. An HTTP server 2304 allows the set top box 2116 to request and retrieve URLs from the Internet. The set top box 2116 includes a number of interfaces 2310, 2312, 2314, 2316 and 2318 that can be used to connect to other devices 2320, 2330, 2340, 2350, 2360. A more detailed description of set top box technology is disclosed in "OpenCable Architecture", by Michael Adams, CiscoPress, 1999 which is incorporated by reference in its entirety. As indicated above, SIP messages can be used to communicate between two or more SIP user agents. In accordance with the present invention, SIP is enhanced by using the protocol to transport Simple Object Access Protocol (SOAP) messages in order to invoke activity on SIP-enabled devices. Details pertaining to SOAP, in particular SOAP specification 1.1, are located at http://msdn.microsoft.com/xml/general/SOAPspec.asp which is incorporated by reference. SOAP message have the general form as follows:

```
            <SOAP:Envelope . . . >
                    <SOAP:Header>
                        . . .
                    </SOAP:Header>
                    <SOAP:Body>
                        . . .
                    </SOAP:Body>
            </SOAP:Envelope>
```

As indicated above, in accordance with the present invention SIP is enhanced by using SOAP messages. The SIP messages take the following listing. The message includes the SIP URL of the sender and recipient. It also specifies the type of the content (viz. text/xml-SOAP).

```
        APPLICATION sip:livingroomstb@att.com SIP/2.0
        Via: ---
        From: Ann <sip:ann@att.com>
        To: Device <sip:livingroomstb@att.com>
        Call-ID: ---
        CSeq: 1 APPLICATION
        Content-Type: text/xml-SOAP
        Content-Length: ---
                SOAP message
```

The SIP-enhanced SOAP messages are communicated between SIP user agents in order to have the various devices and servers perform functions necessary to the implementation of the present invention. Such functions include the ability to identify content stored on various devices, storage availability on those devices, initiate the recording of content on a designated device, and retrieval of the content from the content providers servers.

EXAMPLE #1

An example of how a scheduled hyperlink can be used to record scheduled multimedia content on a designated information appliance will now be described with reference to FIGS. 1–8. A user that desires to record scheduled multimedia content (e.g., a television program) retrieves a web page from web server 134 by inputting the appropriate URL corresponding to the web page address for a particular broadcaster (e.g., www.channel50.com). The web page is displayed on the user's information appliance 106. An example of a web page is illustrated in FIG. 3. Included on the web page is identification of the content provider or broadcaster 320, the date 325 for which the multimedia content is scheduled to be broadcast, the content (e.g., program name) 302, 304, 306, 308 and the times 330, 332, 334, 336 at which it is to be broadcast.

In accordance with the present invention, the program name 302, 304, 306, 308 is a scheduled hyperlink that can be selected by user. In the present example, it is assumed that the user selects the program "Raiders of the Lost Ark" as the content that is to be recorded. The scheduled hyperlink refers to a scheduled hyperlink file that is stored on a scheduled hyperlink server 138. The URL for the scheduled hyperlink uses the following format: http://www.server1.com/raiders-of-the-lost-ark.sch, where .sch represents a new type of hyperlink. The scheduled hyperlink identifies both a scheduled hyperlink server 138 (viz. http://www.server1.com) and a scheduled hyperlink file (viz. raiders-of-the-lost-ark.sch).

The scheduled hyperlink file is, for example, an XML file as shown in the following example. The <name> tag defines the title of the content. Several options for receiving this content are delimited by <option> tags. The first option is television media. The <channel>, <date>, <time>, and <duration> values specify how to receive this television program. The second option is radio media. The <frequency>, <date>, <time> and <duration> values specify how to receive this radio program. The third option is streaming media. The <url> value specifies how to receive this Internet content. An alternative is also provided. The <url> value provides a scheduled hyperlink to the desired content. That scheduled hyperlink may contain multiple options and alternatives of both formats and locations for retrieving that content.

```
<scheduled-hyperlink>
    <name> Raiders of the Lost Ark</name>
        <option>
            <type>television</type>
            <channel>50</channel>
            <date>02-26-01</date>
            <time>21:00 EST</time>
            <duration>2 hours</duration>
        </option>
        <option>
            <type>radio</type>
            <frequency>1010</frequency>
            <date>03-10-01</date>
            <time>20:00 EST</time>
            <duration>2 hours</duration>
        </option>
        <option>
            <type>internet</type>
            <url>http://www.streamingserver.com/raiders.sdp</url>
        </option>
        <alternative>
            <url>.http://www.server1.com/temple-of-doom.sch</url>
        </alternative>
</scheduled-hyperlink>
```

The scheduled hyperlink file may also contain reference to other scheduled hyperlink files having the following format:

```
<scheduled-hyperlink>
    <url>http://www.movies.com/raiders-of-the-lost-ark.sch</url>
</scheduled-hyperlink>
```

This referencing capability allows a content provider to host both the content and the scheduled hyperlink file on their web site.

Referring back to the present example, once the user has selected the content to be recorded, a web page is presented to the user (FIG. 4), which provides the user with a listing of the environments in which the scheduled multimedia content can be recorded and viewed. The web page provides a listing of the selected content 402 and a list of the environments 404, 406, 408, 410, 412 in which the content can be stored and viewed. The environments associated with a particular user are identified by querying data stored in a user directory server 132 and an environment directory server 136.

The user directory server 132 contains information about each user that is necessary to provide the user with, among other things, the ability to record and view multimedia content on a particular information appliance. Included in the user directory server 132 are tables that contain information such as, but not limited to, the user's name, address, telephone number(s), email address, and preference information. Also included in the user directory server 132 is a list of the environments in which the user has access. Each environment is identified by a URL (e.g., http://www.airline.com/environments/4589732). Included in the URL is an identification (ID) that is unique to that environment (i.e., 4589732). It is to be understood by those skilled in the art that access to a particular information appliance may be temporary (e.g., an appliance on an airplane) or permanent (e.g., a home set top box). Accordingly, a table (FIG. 9) contained within the user directory server 132 lists the environments 904 accessible by the user 902 and whether the environment is transient 906. If the environment is transient, an expiration time and date 908 is provided.

The user selects an environment (e.g., home which is listed as URL http://www.isp.com/environments/6541973) by clicking on hyperlink 404 (FIG. 4) and another web page is presented to the user (FIG. 5) that provides a listing of the devices located in that environment. Information pertaining to devices located in a particular environment is stored in the environment directory server 136. A table (FIG. 10) contains a list of environment IDs 1002 and the corresponding location 1004 of each environment (e.g., home). Another table (FIG. 11) identifies the particular devices 1104 associated with a given environment ID 1102, the URL 1106 for the particular device (e.g., sip:livingroomstb@6541973isp.com), and the group ID 1108 assigned to the device.

The group ID 1108 corresponds to a table (FIG. 12), which provides a list of the users 1204 which may access the device and the permissions 1206 associated with each user. For example, the user Joe O'Neil has the ability to configure, delete, list, record and view any content on the devices to which he can access. However, the user Jennifer Casto may only view the content stored on these devices. It is to be understood that while the present example shows the data in the environment directory server 136 as separate tables, that the data may be stored in a single table or a different combination of tables without departing from the scope and spirit of the present invention.

In accordance with the present invention, SIP-enhanced SOAP messages may be communicated between the scheduled hyperlink server 138 and the environment directory server 136 to list, add or delete permissions for a given user. It is to be understood by those skilled in the art, that each SOAP message described below would include an appropriate SIP header as described in detail above.

The following message may be used to request a list of permissions available to users of a particular environment::

```
<SOAP:Envelope . . . >
    <SOAP: Body>
        <m:ListPermissions>
        </m:ListPermissions>
    </SOAP:Body>
</SOAP:Envelope>
```

The environment directory server 136 would return the following response:

```
<SOAP:Envelope . . . >
    <SOAP:Body>
        <ListPermissionsResponse>
            <permission>
                <name>Default</name>
                <rights>None</rights>
            </permission>
            <permission>
                <name>Joe O'Neil</name>
                <rights>Record</rights>
            </permission>
            <permission>
                <name>John Casto</name>
                <rights>Record, List, View, Delete</rights>
            </permission>
            <permission>
                <name>Jennifer Casto</name>
                <rights>View</rights>
            </permission>
        </ListPermissionsResponse>
    </SOAP:Body>
</SOAP:Envelope>
```

The following message can be used to request that permission levels be added for a particular user:

```
<SOAP:Envelope . . . >
    <SOAP:Body>
        <m:AddPermissions>
            <permission>
                <name>Jennifer Casto</name>
                <rights>View</rights>
            </permission>
        </m: AddPermissions>
    </SOAP:Body>
</SOAP:Envelope>
```

The environment user directory 136 would respond with the following message:

```
<SOAP:Envelope . . . >
    <SOAP:Body>
        <AddPermissionsResponse>
        </AddPermissionsResponse>
    </SOAP:Body>
</SOAP:Envelope>
```

The following message can be used to delete permission levels for a particular user:

```
<SOAP:Envelope . . . >
    <SOAP:Body>
        <m:DeletePermissions>
            <permission>
                <name>Jennifer Casto</name>
                <rights>View</rights>
            </permission>
        </m:DeletePermissions>
    </SOAP:Body>
</SOAP:Envelope>
```

The environment directory server 136 would respond with the following message:

```
<SOAP:Envelope ... >
    <SOAP:Body>
        <DeletePermissionsResponse>
            </DeletePermissionsResponse>
    </SOAP:Body>
</SOAP:Envelope>
```

In the present example (FIG. 5), the devices available for storing the multimedia content (i.e., the movie Raiders of the Lost Ark) are the living room set top box 504, the den set top box 506 and the family room set top box 508. Also listed with each device are the number of total storage hours 510 associated with each device and the number of available storage hours 512 available for recording content. Each device listing 504, 506, 508 is a hyperlink which can be selected by the user. In the present example, the user selects the living room set top box hyperlink 504. As a result, another web page is retrieved (FIG. 6) which provides additional data about that particular device.

The web page 600 provides a high level summary 602 of the storage capacity and availability of the living room set top box. Also provided is a more detailed listing 604 of the multimedia content which has been stored, is scheduled for recording, or is being recorded. In the present example, the living room set top box is capable of storing 10 hours of multimedia content and 9 hours has been scheduled for use. Since the movie (i.e., Raiders of the Lost Ark) requires 2 hours of storage time and only 1 hour is available, the user must either delete some of the content on the living room set top box or record the movie on a different information appliance. To delete particular content, the user places an "x" in the box associated with the particular content.

Hyperlinks 606, 608, 610, 612, 614 are presented on the web page 600 in order to allow the user to perform other content management capabilities. An environments hyperlink 606 allows the user to view other environments that the user has access to and in which he may record content. A devices hyperlink 608 allows the user to view the devices on which the user can record content as well as the content which may already be stored on the device or which is scheduled to be stored on that particular device. A record hyperlink 610 allows the user to schedule recording of the content on the device. A configure hyperlink 612 allows the user to assign, configure, delete, list, record, and view permissions for individual and groups. An email hyperlink 614 allows the user to email the scheduled content information to another user so that that user can record the content on a device of his or her choosing.

Figure 7:
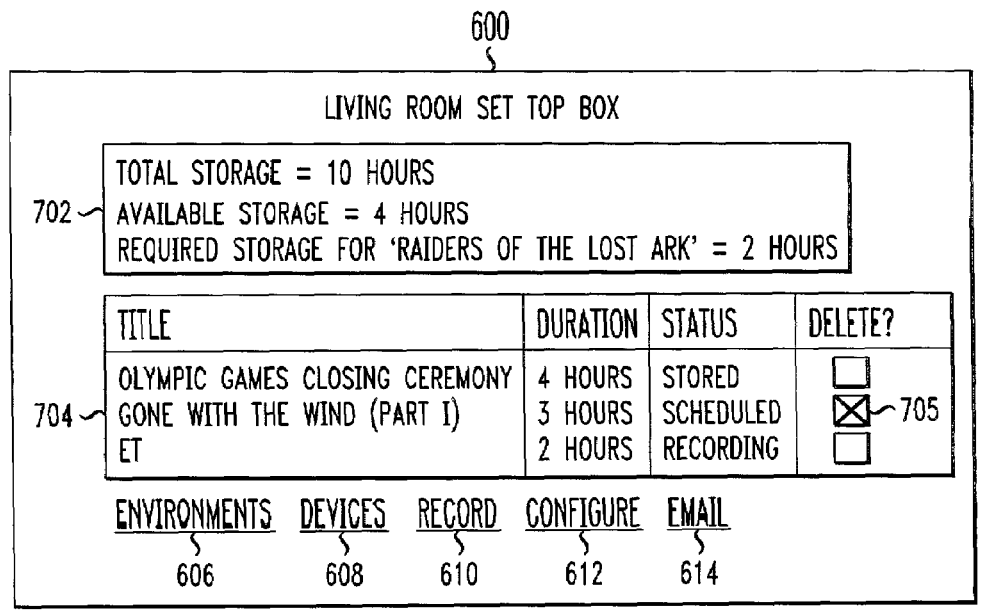
FIG. 7 is an illustration of the web page of FIG. 6 in which content associated with the device is to be deleted in accordance with the present invention.

As illustrated in FIG. 7, the user decides to delete content (i.e., the movie Gone With the Wind) from the memory of the living room set top box by placing an "x" in the delete box 705 associated with that particular movie. By doing so, the living room set top box now has 4 hours of storage time available and the movie "Raiders of the Lost Ark" can now be easily recorded on this device.

Figure 8:
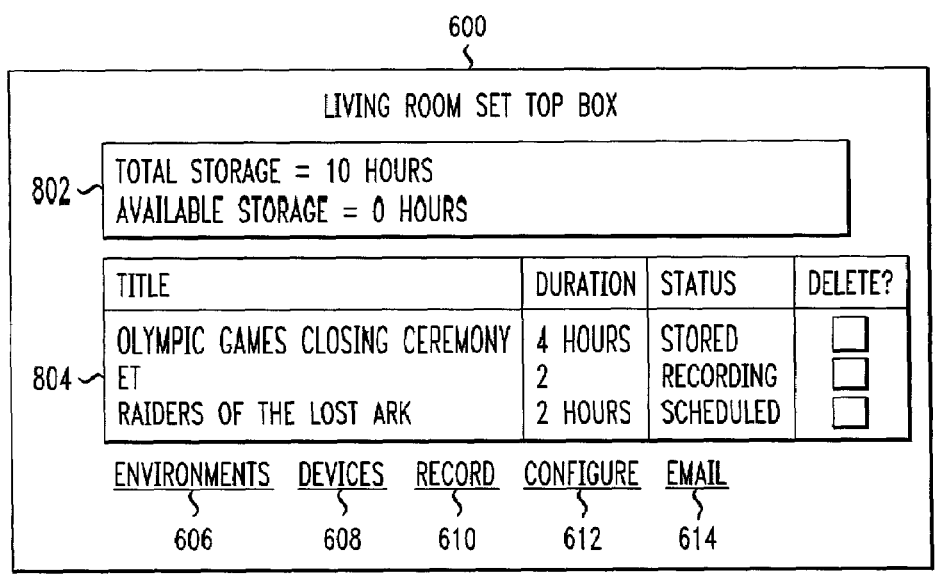
FIG. 8 is an illustration of the web page of FIG. 6 in which the updated statistics associated with the device are displayed in accordance with the present invention.

As illustrated in FIG. 8, the web page 600 is updated to reflect the change in the programming of the living room set top box. As a result of scheduling the recording "Raiders of the Lost Ark" instead of "Gone with the Wind", there are now 2 hours of storage time available on the living room set top box. At the appropriate time, the movie is recorded on the living room set top box and can be viewed at the user's discretion.

MESSAGE SEQUENCE

Figure 13:
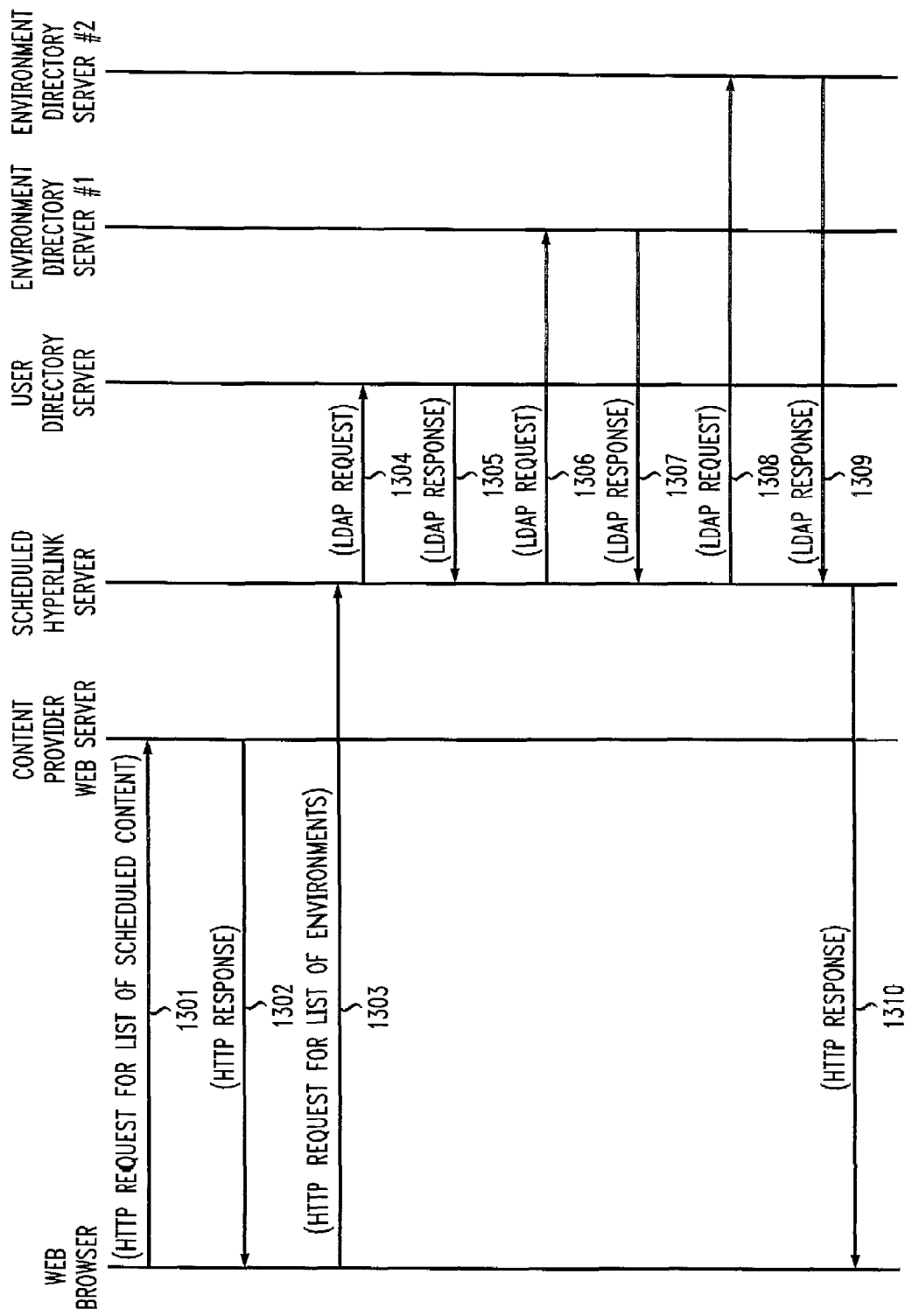
FIGS. 13–15 are illustrations of message sequences between the user's web browser and a plurality of servers in accordance with the present invention.
Figure 14:
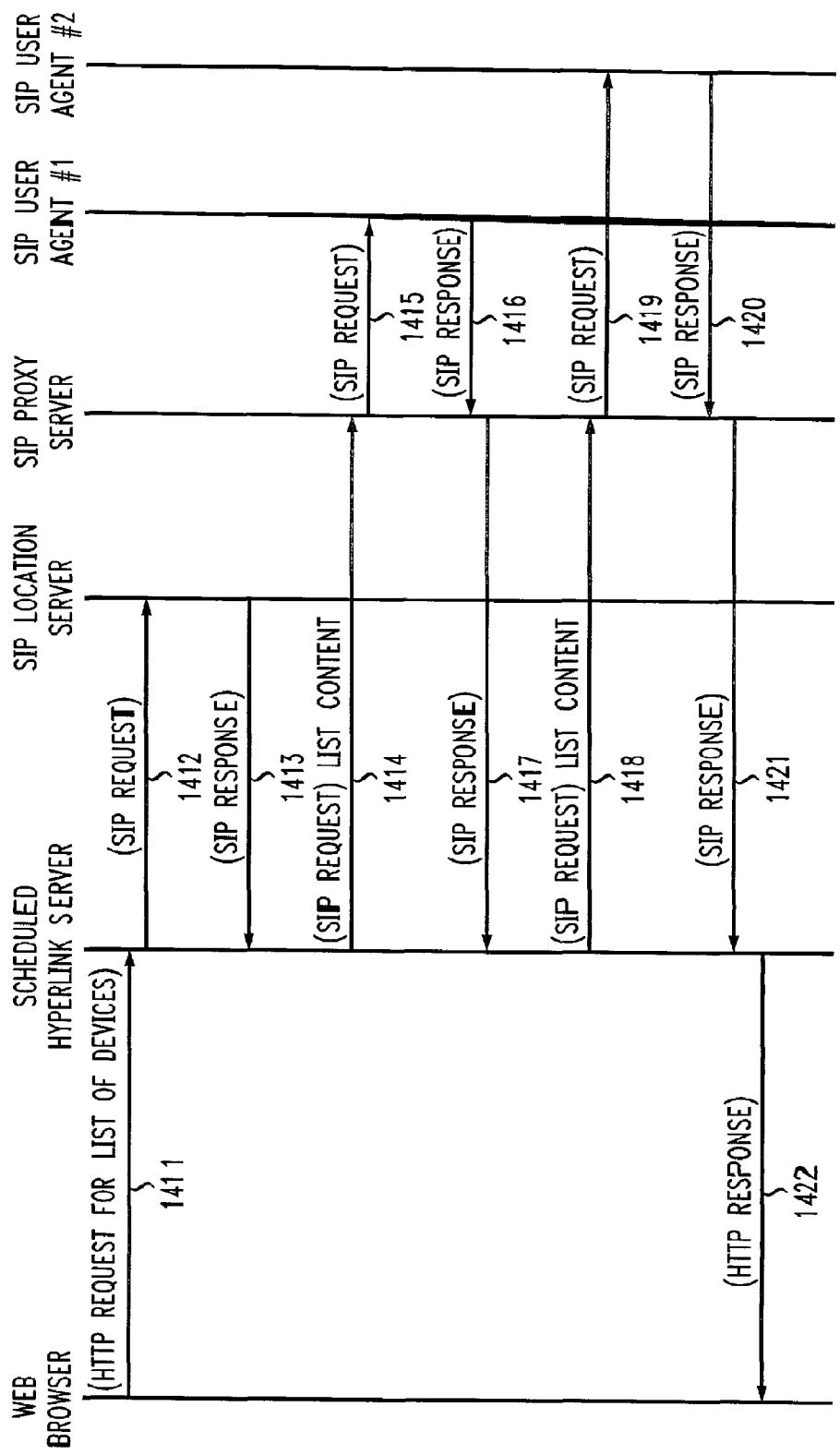
Figure 15:
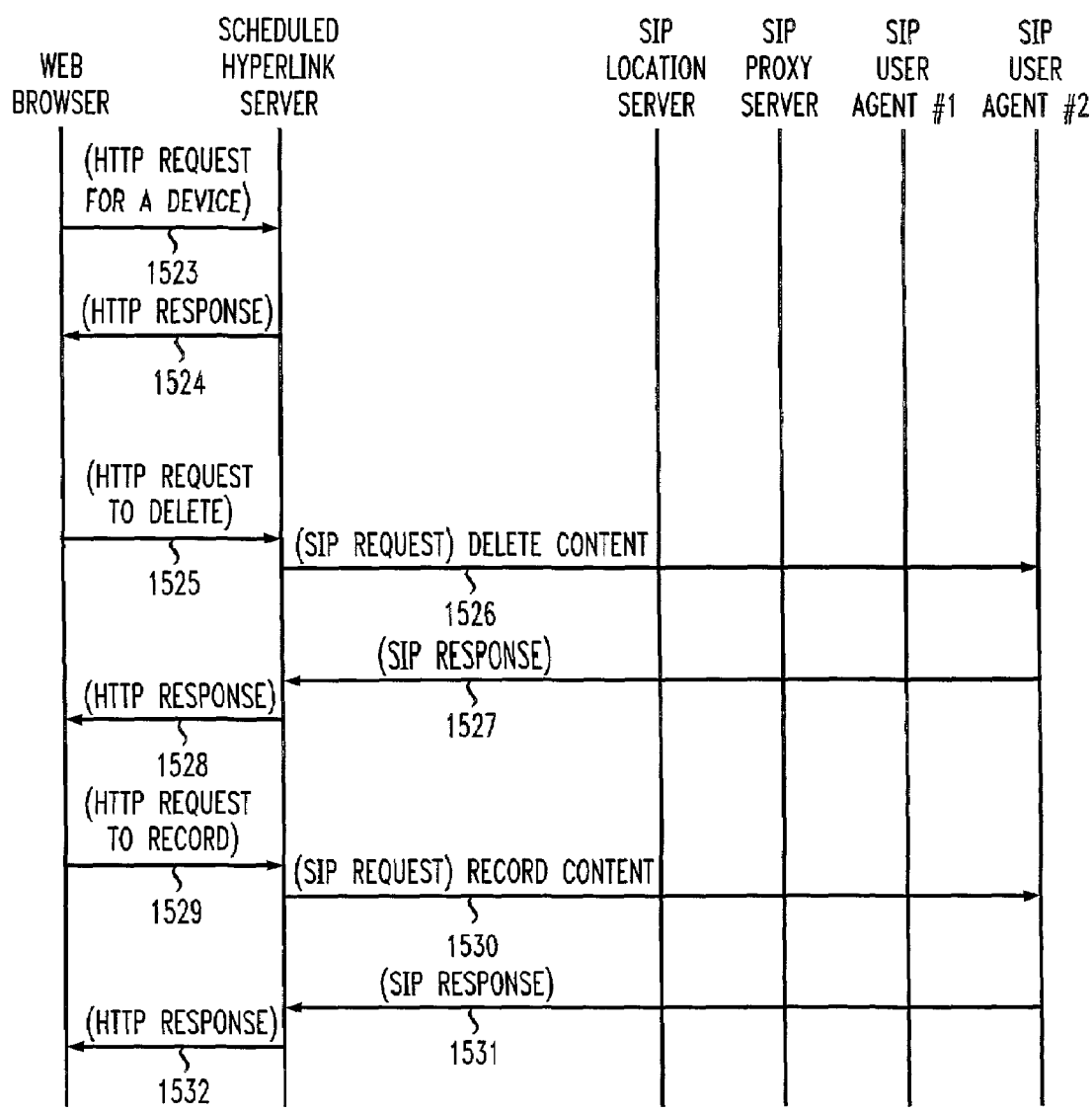

The messaging sequence between the user's web browser and the various servers needed to implement the present invention will now be described. Referring specifically to FIGS. 13–15, a HyperText Transfer Protocol (HTTP) request message is communicated from the web browser (i.e., information appliance 106) to the content provider web server 134 which requests a web page listing of available content from that provider (message 1301). HTTP is a well-known protocol used to retrieve documents from web servers over the Internet. An HTTP response message is communicated from the content provider web server 134 to the user's web browser that includes a web page which lists the available content (message 1302). Next, an HTTP request message is communicated from the web browser to the scheduled hyperlink server 138 which requests a web page listing of the environments available to the user (message 1303).

In response to the HTTP request, a Lightweight Directory Access Protocol (LDAP) request message is communicated by the scheduled hyperlink server 138 to the user directory server 132 which requests a listing of the environment IDs for the user (message 1304). LDAP is a well-known open Internet standard produced by the Internet Engineering Task Force (IETF), which allows clients to read and write directory data. An LDAP response message is sent from the user directory server 132 to the scheduled hyperlink server 138 that provides the listing of environment IDs for the user (message 1305).

An LDAP request message is then sent from the scheduled hyperlink server 138 to each environment directory server that corresponds to the list of environment IDs for the user. The message requests additional data about each environment ID. The data may include the name of the environment, an indication if the environment is transient, and if so, an indication of the date and time at which it is available to the user.

As illustrated in FIG. 13, two message requests (messages 1306, 1308) to two environment directory servers that would correspond to two of the environment IDs associated with the user. It is to be understood by those skilled in the art, that for each environment ID associated with the user, a request is transmitted by the scheduled hyperlink server 138 to the appropriate environment directory server. It is also to be understood by those skilled in the art that the particular arrangement illustrated in this example is merely exemplary and that other suitable arrangements may be used for the scheduled hyperlink server 138 to about information about each environment associated with the user.

An LDAP response message is communicated from each queried environment directory server (messages 1307, 1309), which provides the requested information about that particular environment. The scheduled hyperlink server 138 then communicates an HTTP response message to the web browser, which includes the requested information (FIG. 4).

Referring to FIG. 14, in response to a user's activation of one of the hyperlinks on the web page presented to the user which corresponds to a selection of one of the environments, an HTTP message is sent from the user's web browser to the scheduled hyperlink server 138 requesting a list of devices associated with the selected environment (message 1411). A SIP request is communicated by the scheduled hyperlink server 138 to the SIP location server 140 that requests a list of IP addresses of SIP proxies that correspond to the SIP URLs of the devices in the selected environment (message 1412). A SIP response message is communicated by the SIP location server 140 to the scheduled hyperlink server 138 that includes a list of the SIP URLs for each device in the selected environment and the corresponding IP address of the SIP proxy server 130 associated with the device (message 1413).

For each identified device a SIP request message (ListContent) is communicated from the scheduled hyperlink server 138 to the SIP proxy server associated with a particular device requesting a list of the contents on that device (e.g., total amount of storage time, available storage, list of stored or scheduled content, etc.), (messages 1414, 1418). As described above, the ListContent message is a SOAP message as follows:

```
<SOAP:Envelope ... >
    <SOAP:Body>
        <m:ListContent>
        </m:ListContent>
    </SOAP:Body>
</SOAP:Envelope>
```

A SIP request message is communicated by the SIP proxy server to the SIP user agent associated with each particular device in that environment (messages 1415, 1419). A SIP response message is communicated by each SIP user agent to the SIP proxy server that includes a list of the total storage available on the device, amount of storage available, and a listing of what is currently stored or is scheduled to be stored on the device (messages 1416, 1420).

The scheduled hyperlink server receives the list of devices at each environment, as well as the detailed storage information for each device (messages 1417, 1421). As with the SIP request message, the response is a SOAP message as shown in the following listing. The <environment> value specifies the name of the environment. The <device> value specifies the name of a device in that environment. The total and available storage is specified by the next two values. An <item> value provides information about four programs. For each program, a <title>, <duration> and <status> value are defined. The <status> value indicates if that program is stored on the device, is scheduled for recording at a later time, or is currently being recorded.

```
<SOAP:Envelope ... >
    <SOAP:Body>
        <ListContentResponse>
            <environment>Home</environment>
            <device>Living Room Set Top Box</device>
            <total>10 Hours</total>
                <available>1 Hour</available>
                <item>
                    <title>Olympic Games Closing Ceremony</title>
                    <duration>4 Hours</duration>
                    <status>Stored</status>
                <item>
                <item>
                    <title>Gone with the Wind (Part I)</title>
                    <duration>3 Hours</duration>
                    <status>Scheduled</status>
                <item>
                <item>
                  <title>ET</title>
                  <duration>2 Hours</duration>
                  <status>Recording</status>
                <item>
        </ListContentResponse>
    </SOAP:Body>
</SOAP:Envelope>
```

The scheduled hyperlink server sends an HTTP response message to the user's web browser in the form of a web page (FIG. 5) that contains all of the retrieved information from the SIP user agents (message 1422).

Referring to FIG. 15, in response to a user's activation of one of the hyperlinks on the web page presented to the user which corresponds to a selection of a particular device, an HTTP message is sent from the user's web browser to the scheduled hyperlink server 138 requesting a detailed listing of the contents stored on that particular device (message 1523). An HTTP response is communicated from the scheduled hyperlink server to the user's web browser in the form of a web page (FIG. 6) that provides the detailed information pertaining to the particular device (message 1524).

In response to the user's selection of a check box on the web page (FIG. 6), an HTTP request message is communicated to the scheduled hyperlink server to delete stored content on the device (message 1525). The scheduled hyperlink server sends a SIP request message (DeleteContent) to the SIP user agent associated with the particular device to delete the particular content (message 1526). The DeleteContent message is a SOAP message of the following form:

```
<SOAP:Envelope ... >
    <SOAP:Body>
        <m:DeleteContent>
            <name>Gone With the Wind (Part I)</name>
        </m:DeleteContent>
    </SOAP:Body>
</SOAP:Envelope>
```

A SIP response message is communicated by the SIP user agent to the scheduled hyperlink server indicating that the content has been deleted (message 1527). The response message is a SOAP message of the following form:

```
<SOAP:Envelope ... >
    <SOAP:Body>
        <DeleteContentResponse>
            <available>4 Hours</available>
        </DeleteContentResponse>
    </SOAP:Body>
</SOAP:Envelope>
```

An HTTP response message is communicated to the user's web browser in the form of a web page (FIG. 8) indicating that the content has been deleted (message 1528).

In response to the user's activation of a hyperlink on the web page (FIG. 6), an HTTP request message is sent to the scheduled hyperlink server requesting that the selected content be recorded on the device (message 1529). A SIP request message (RecordContent) is communicated by the scheduled hyperlink server to the SIP user agent requesting that the selected content be recorded on the device (message 1530). The RecordContent message is a SOAP message shown in the following listing. The <name>, <channel>, <date>, <time> and <duration> values indicate the specific program to be recorded.

```
<SOAP:Envelope ... >
    <SOAP:Body>
        <m:RecordContent>
```

```
            <name>Raiders of the Lost Ark</name>
            <channel>50</channel>
            <date>February 26, 2001</date>
            <time>21:00 EST</time>
            <duration>2 hours</duration>
        </m:RecordContent>
    </SOAP:Body>
</SOAP:Envelope>
```

A SIP response message is communicated by the SIP user agent to the scheduled hyperlink server indicating that the requested action has been performed and that the content is scheduled to be recorded on the device (message 1531). The response message is a SOAP message shown in the following listing. The response specifies how much time remains available on the device.

```
<SOAP:Envelope . . .>
    <SOAP:Body>
        <RecordContentResponse>
            <available>5 Hours</available>
        </RecordContentResponse>
    </SOAP:Body>
</SOAP:Envelope>
```

An HTTP message is communicated by the scheduled hyperlink server to the user's web browser in the form of a web page (FIG. 8) indicating the updated content information for the device (message 1532). The updated content information indicates that the deleted content has been removed from the device storage and that the desired content is scheduled to be recorded on the device.

EXAMPLE #2

A second example of how a scheduled hyperlink can be used to record scheduled multimedia content on a designated information appliance will now be described. In particular, a user will request to record multimedia content that has already been broadcast. Referring back to FIG. 3, it is assumed that the web page retrieved by the user includes a listing of program content that was broadcast on the previous day. As before, each program listing is a hyperlink which may be accessed by the user. The user selects the hyperlink which corresponds to the movie "Raiders of the Lost Ark". When the scheduled hyperlink server receives the request initiated by the user's selection of the hyperlink, the scheduled hyperlink server queries the content provider's servers to retrieve other available broadcasts or recordings of the requested content, as well as listings of alternative content that may be of interest to the user. A web page (FIG. 16) is presented to the user that includes the results of the query.

Included on the web page is a list 1602 of other content providers that have the desired program content and when that content is available if the content is in the form of a broadcast. Also present to the user are a list 1604 of alternative program content (i.e., movie "Indiana Jones and the Temple of Doom"), the content providers and the date and time at which the content is available if the content is in the form of a broadcast. Each listing on the web page is a scheduled hyperlink that may be selected by the user. As in Example #1, once the user has selected a hyperlink, a web page including a list of environments to which the user has access is presented to the user. Once the user has selected an environment and a device, a determination is made as to whether the device has enough storage space available to record the desired content. If so, the content is scheduled for recording on that device.

EXAMPLE #3

A third example of how a scheduled hyperlink can be used to record scheduled multimedia content on a transient information appliance to which the user has access will now be described. In the present example, it is assumed that the user has scheduled a trip to Japan. All arrangements associated with trip (e.g., limousine, airline reservation information, hotel information) is stored in a calendar which resides on one of the user's information appliances (e.g., PC). The SIP user agent associated with the PC has access to the calendar information. A message is communicated to the User Directory server 132 indicating which environments (i.e., appliances accessible to the user at each of the transient locations) may be accessible to the user and the dates and times at which they are accessible. For example, if the user's trip is from May 1–8, then the user may have access to the airplane information appliance on May 1 and May 8 and access to the hotel information appliance from May 2–7.

Figures 18, 19:
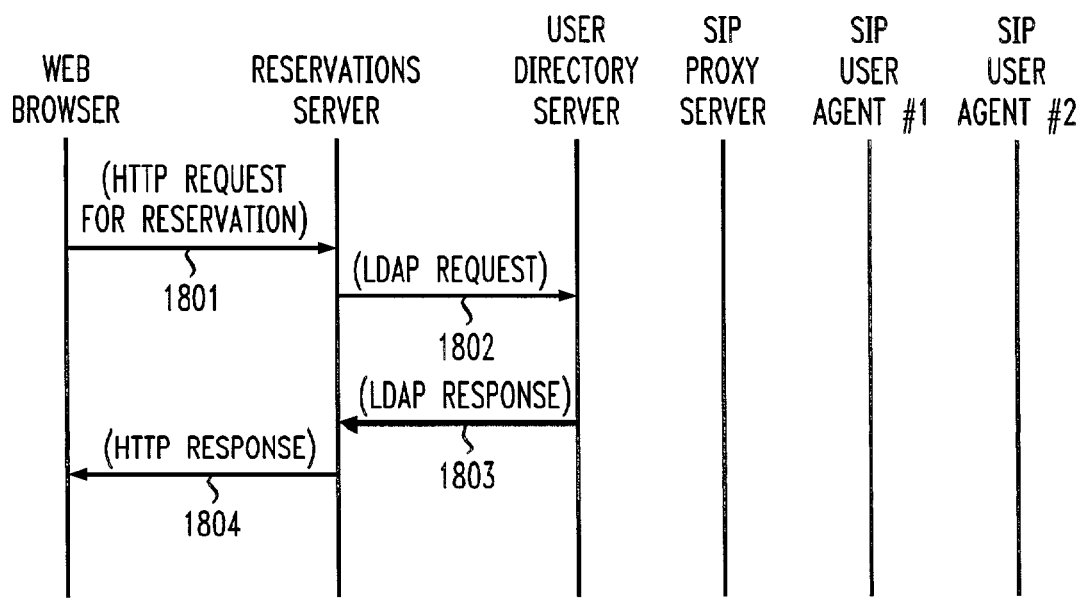
FIG. 18 illustrates a message sequence between the user's web browser and a plurality of servers in accordance with the present invention.
FIG. 19 illustrates an email message from a teacher to students that includes a scheduled hyperlink in accordance with the present invention.

The specific message sequence is illustrated in FIG. 18. An HTTP request message is communicated from a web browser to a reservations server 142 (message 1801). The request can be to add, change or delete reservations (e.g., environment URLs) for a particular user. In the present example, the user is requesting that the reservations (i.e., environment URLs for the limousine, airplane and hotel) be added to his user directory. Because these are transient environments for this user, included in the request would be the dates and times at which the environments would be available to the user. The reservation server 142 is the entity that is used to approve and communicate the transient environments to the user directory server 132. Depending upon the entity that controls the transient environment, it may be possible for the user to record content prior to the user's ability to access the environment.

A LDAP request message is communicated by the reservation server 142 to the user directory server 132 to update the list of environment URLs for the user (message 1802). Included in the LDAP message is the URLs for each transient environment (i.e., http://www.airline.com/environments/4589732, http://www.limo.com/environments/3452212, and http://www.hotel.com/environments/12976123), and the dates and times at which the user is entitled to access these transient environments. An LDAP response message is communicated from the user directory server 132 to the reservation server 142 indicating that the update has been made to the user's directory (message 1803). An HTTP response is communicated by the reservation server 142 to a web browser indicating that the user's directory has been updated with the requested information (message 1804).

As in the previous examples, the user accesses a web page provided by the web server 134 by inputting the appropriate URL corresponding to the web page address for a particular broadcaster (e.g., www.channel50.com). The user selects one of the scheduled hyperlinks corresponding to the content that he wishes to record. A web page is presented to the user that lists the environments to which the user has access. Included in the list are the transient environments described above. In the present example, the user selects the hyperlink corresponding to the hotel.

The user is then presented to a list of devices associated with the hotel. In accordance with the present invention, the hotel may store the selected content on a number of different devices. If the number of the room that the user will be assigned is already known by the hotel, the user may be able to record and store the content on a device in the room, such as a set top box or digital video recorder. Alternatively, the hotel may have a local server on which content is recorded and stored. In addition to the content, an identification of the user would be stored so that the content could be delivered to the user's room during the appropriate dates at a time selected by the user.

A further alternative would be to have a remote server used by multiple hotels belonging to the same hotel chain. The content is recorded and stored on the remote server and delivered to the user's room during the appropriate dates at a time selected by the user. In the alternative arrangements, it is presumed that both the server and the device in the user's room would include SIP user agents which could be used to present the content to the user upon request by the user. The steps by which the user schedules the recording of the content is the same as described in example #1.

EXAMPLE #4

Figure 24:
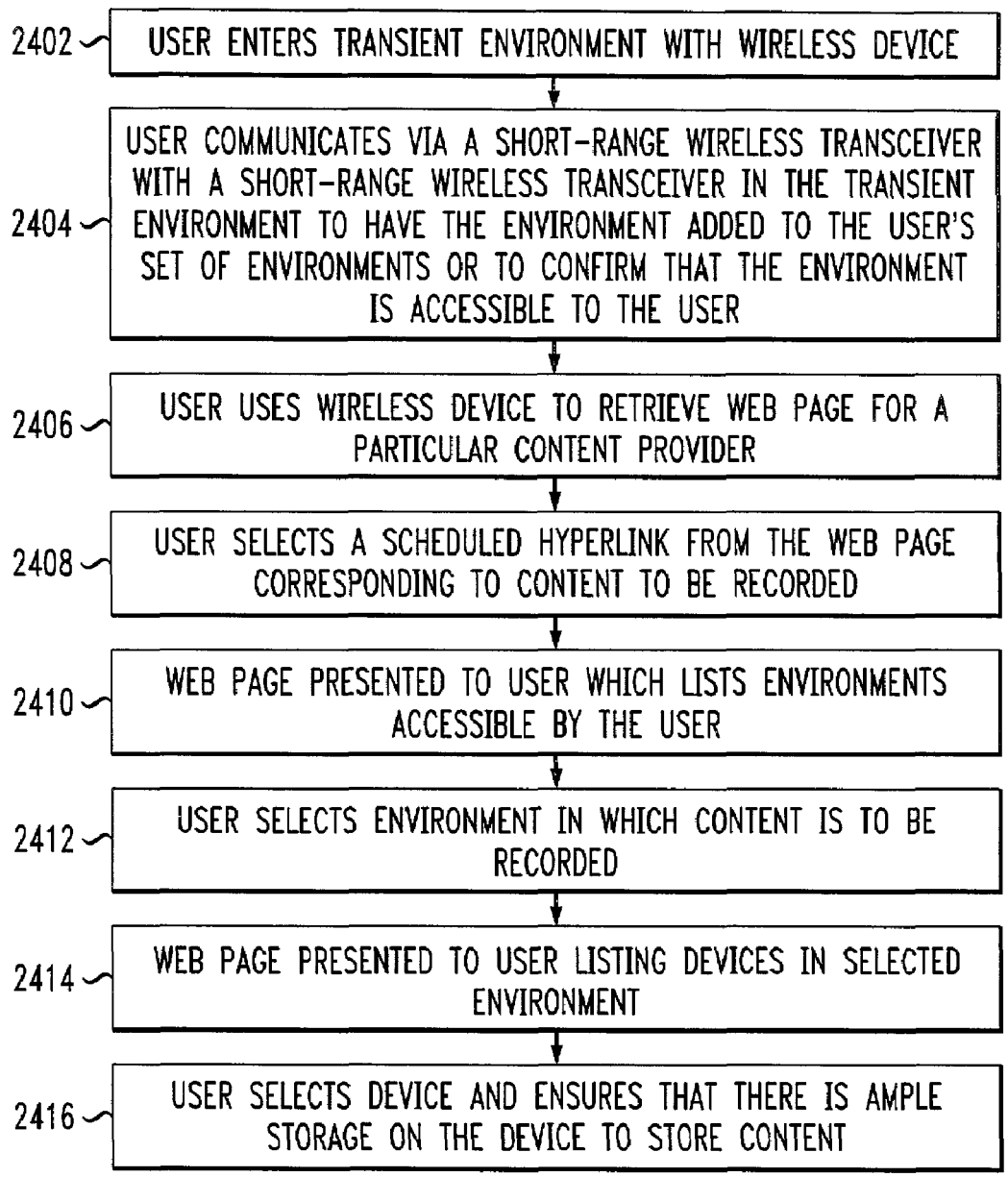
FIG. 24 is a flow chart that depicts the steps required to record scheduled content via a scheduled hyperlink using a wireless device in accordance with the present invention.

A fourth example of how a scheduled hyperlink can be used to record scheduled multimedia content on a transient information appliance to which the user has access will now be described with reference to FIG. 24. In the present example, the user is able to access scheduled content in a transient environment using a wireless device. More specifically, the user accesses a mobile device, such as a cell phone with Internet capability or handheld organizer to retrieve a web page provided by a content provider (see FIG. 2 and accompanying description above).

A user enters a transient environment, such as a hotel room or conference with a wireless device room (step 2402). A short-range wireless transceiver in the wireless device communicates with a short-range wireless transceiver located in the environment in order to establish the environment as one accessible to the user or to confirm that the environment is accessible to the user (step 2404).

In accordance with the present invention, multiple scenarios could be envisioned in which a user may want to record content in a transient environment. The transient environment may be available to the user for specific dates and times (e.g., a hotel reservation or conference room reservation) or more in an on-demand manner (e.g., a real-time reservation of the conference room). In the case of a pre-arranged reservation, the user's environment server may already include the environment as accessible to the user. However, in the case of a real-time reservation, the environment may need to be added to the user's environment server.

Once permission to record in the environment has been confirmed, the user uses the wireless device to retrieve a web page containing a listing of content provided by one or more content providers (step 2406). The user selects the content that he wishes to record (step 2408). A web page is presented to the user listing the environments accessible to the user (step 2410). The user selects the transient environment in which he is currently located (step 2412). Next, a web page containing a list of devices available in the environment is presented to the user (step 2414). It is to be understood by those skilled in the art that all of the devices or a subset of the devices in the environment may be accessible to the user.

The user selects a device on which the content is to be recorded (step 2416). Next, a web page is presented to the user listing the amount of available storage time on the particular device. Since the user is in a transient environment which can be used by multiple users, the user may not be able to determine what specific content is recorded or scheduled to be recorded on the device. If there is not enough time on the device to record the selected content, the user may either be presented with a list of content that can be deleted or may be directed to choose another device. If it is determined that there is adequate storage time to record the selected content, the user can schedule the recording of the content on that device.

In accordance with the present invention, the user may be able to schedule content to be recorded and viewed at a later time provided that the user has access to the environment at that later time. Alternatively, the user may only be able to record and view content in the transient environment during the time in which the user is physically located in the environment.

EXAMPLE #5

A fifth example of how a scheduled hyperlink can be used to communicate to one or more third parties scheduled multimedia content that can be recorded and viewed on a device of that third party's choosing will now be described. For example, a teacher of a distance learning course could send each student an email containing one or more scheduled hyperlinks containing material to be discussed in a later class. Alternatively, alternative means of communication between the teacher and the students could be used, such as, but not limited to voice mail messaging, instant messaging, or linking to a web page specified by the teacher. As will be described hereinafter, each student arranges for the scheduled content to be recorded and viewed on a particular device. Alternatively, the teacher could decide on which device the content is to be recorded and viewed and communicate that information to each student.

Figure 20:
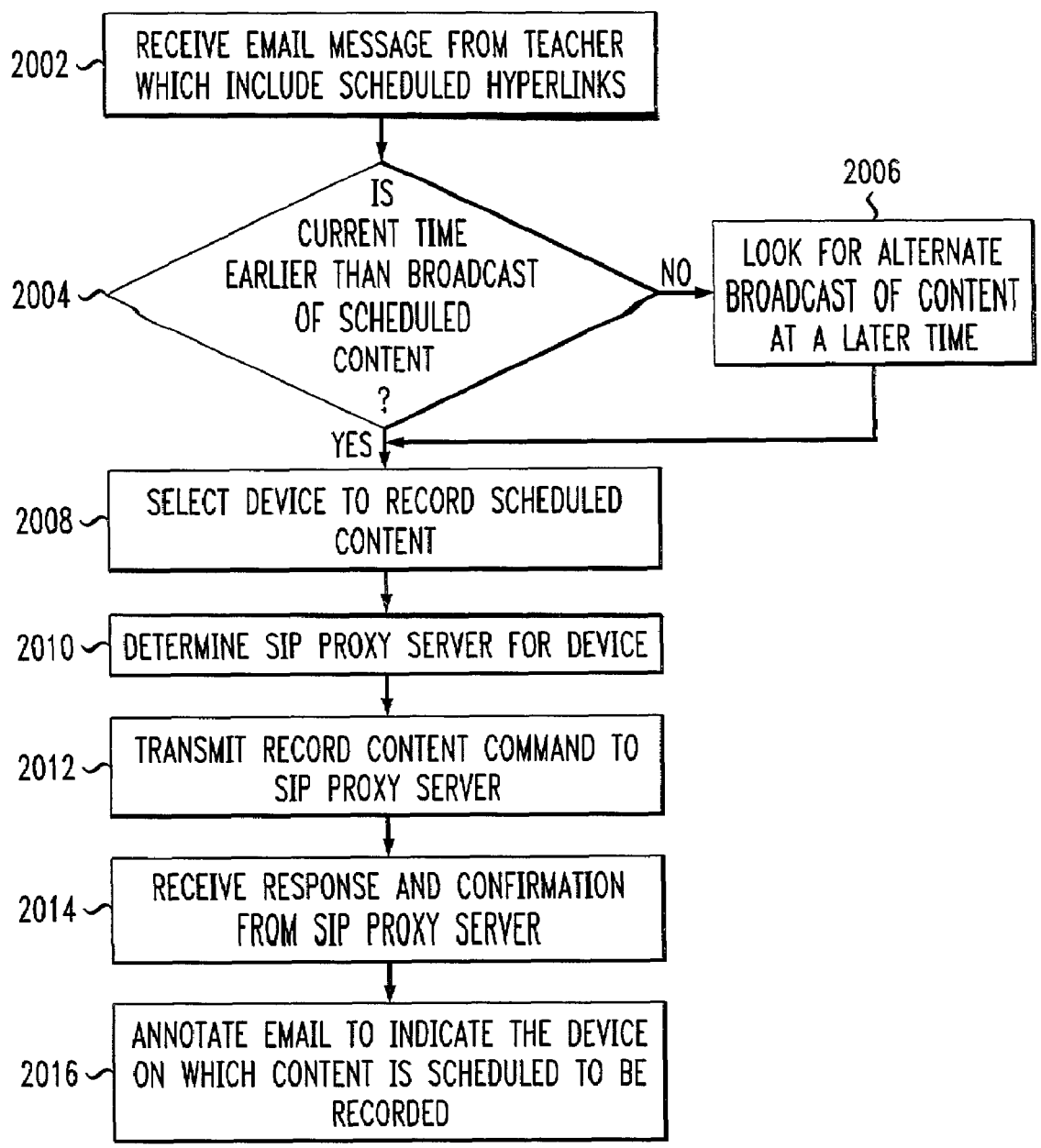
FIG. 20 is a flow chart that depicts the steps required to record scheduled content via a scheduled hyperlink communicated in an email message in accordance with the present invention.

Referring to FIGS. 19 and 20, the teacher sends each student an email (FIG. 19) that includes two scheduled hyperlinks 1906, 1908 in the body 1904 of the email message. Upon receipt of the email message (step 2002), each scheduled hyperlink is automatically processed by the electronic mail reader software. For each scheduled hyperlink, a determination is made as to whether the scheduled content has already been broadcast (step 2004). If the scheduled content has been broadcast, a search is performed by the web server 134 to determine if there is an alternate broadcast of the same content at a later time (step 2006). If the scheduled content has not yet been broadcast, an environment and device are selected onto which the content is to be recorded and later viewed (step 2008).

Once the user has identified the device, a determination is made by the SIP location server 140 as to which SIP proxy server 130 is associated with the selected device (step 2010). A RecordContent request message is communicated by the scheduled hyperlink server 146 to the SIP user agent associated with the device via the SIP proxy server 130 (step 2012). A confirmation response is received by the scheduled hyperlink server from the SIP user agent associated with the device indicating that the content has been scheduled to be recorded (step 2014). In one embodiment of the present invention, the email message is annotated to include the information pertaining to the recording of the content (e.g., the device on which the content is to be stored, the time and date scheduled for recording, etc.) (step 2016).

Either prior to or at the time at which the class is to commence, the content can be viewed by the user for discussion with the teacher and other students. This technique can also be used for business meetings, event planning, and family gatherings, among other things. It is also possible for one or more of the students to send scheduled hyperlinks corresponding to supplemental content that may be relevant to the class.

While the present invention has been described in connection with the illustrated embodiments, it will be appreciated and understood that modifications may be made without departing from the true spirit and scope of the invention. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

I claim:

1. A method of establishing communications with one or more devices located in an environment using a wireless communication device, the wireless communication device comprising a short-range transceiver and a long-range transceiver, the short-range transceiver of the wireless communication device being able to communicate with a short-range transceiver located in the environment, the method comprising:
   a) receiving a communication from the short-range transceiver of the wireless communication device, the communication including a request to establish communications with one or more device located in the environment;
   b) transmitting a request to an environment directory server to determine if a user associated with the wireless communication device has permission to access any of the devices in the environment;
   c) receiving a response from the environment directory server in response to the request, wherein said step of receiving a response from the environment directory server includes:
      c1) providing an indication as to whether access to the devices in the environment is transient; and
      c2) if so, providing dates and times at which the wireless communication device can access the devices in the environment; and
   d) communicating to the short-range transceiver of the wireless communication device whether the device can communicate with any of the devices in the environment.

2. The method according to claim 1, wherein said wireless communication device is identified by a Session Initiation Protocol (SIP) Uniform Resource Locator (URL).

3. The method according to claim 2, wherein said environment directory server uses the SIP URL of the wireless communication device to determine if the wireless device has access to any of the devices in the environment.

4. The method according to claim 1, wherein the wireless device is a cell phone.

5. The method according to claim 1, wherein the wireless device is a personal communication device.

6. The method according to claim 1, wherein the wireless device is a handheld organizer.

7. The method according to claim 1, wherein the environment directory server comprises a list of devices associated with an environment and a list of users which can access the environment.

8. The method according to claim 7 wherein the list of users further includes permission levels for each user.

* * * * *